United States Patent
Giuntini

(10) Patent No.: US 12,249,864 B2
(45) Date of Patent: Mar. 11, 2025

(54) UNINTERRUPTIBLE POWER SUPPLY CONVERTER CIRCUIT

(71) Applicant: ABB Schweiz AG, Baden (CH)

(72) Inventor: Lorenzo Giuntini, Locarno (CH)

(73) Assignee: ABB Schweiz AG, Baden (CH)

( * ) Notice: Subject to any disclaimer, the term of this patent is extended or adjusted under 35 U.S.C. 154(b) by 17 days.

(21) Appl. No.: 18/304,917

(22) Filed: Apr. 21, 2023

(65) Prior Publication Data

US 2023/0268764 A1    Aug. 24, 2023

Related U.S. Application Data

(63) Continuation of application No. PCT/EP2021/078877, filed on Oct. 19, 2021.

(30) Foreign Application Priority Data

Oct. 23, 2020   (EP) .................................... 20203666

(51) Int. Cl.
*H02J 9/06*    (2006.01)
*H02M 1/14*    (2006.01)
*H02M 3/158*   (2006.01)

(52) U.S. Cl.
CPC ............. *H02J 9/06* (2013.01); *H02M 1/143* (2013.01); *H02M 3/1584* (2013.01); *H02J 2207/20* (2020.01)

(58) Field of Classification Search
CPC ........ H02J 9/06; H02J 2207/20; H02M 1/143; H02M 3/1584
See application file for complete search history.

(56) References Cited

U.S. PATENT DOCUMENTS

| 5,523,665 | A  | 6/1996 | Deaver |
| 7,274,112 | B2 | 9/2007 | Hjort et al. |

(Continued)

FOREIGN PATENT DOCUMENTS

| EP | 2966754 A1 * | 1/2016 | ............. H02J 9/062 |
| EP | 2966754 B1 | 10/2017 | |
| EP | 3557745 A1 | 10/2019 | |

OTHER PUBLICATIONS

European Patent Office, International Search Report in International Patent Application No. PCT/EP2021/078877, 3 pp. (Nov. 15, 2021).

(Continued)

*Primary Examiner* — Jared Fureman
*Assistant Examiner* — Duc M Pham
(74) *Attorney, Agent, or Firm* — Leydig, Voit & Mayer, Ltd.

(57) ABSTRACT

An uninterruptible power supply (UPS) converter circuit includes a controlled switching element, a filter capacitor, and a split DC capacitor comprising a plus DC capacitor and a minus DC capacitor split at a DC-link mid-point, connected to each other at the DC-link mid-point on a respective first side. A second side of the input filter capacitor at an AC point is coupled via an inductor element to a second side of the controlled switching element, the second side of the controlled switching element being coupled to the second side of the plus DC capacitor and the minus capacitor. The controlled switching element operates is configured to be controlled such that a current from the AC point via the inductor element flows alternatingly to either the plus DC output capacitor or the minus DC capacitor, and to the DC-link mid-point, respectively, thereby discharging the input filter capacitor.

12 Claims, 3 Drawing Sheets

(56) References Cited

U.S. PATENT DOCUMENTS

| | | | |
|---|---|---|---|
| 8,953,347 B2 | 2/2015 | Jin et al. | |
| 9,263,939 B2 | 2/2016 | Jin et al. | |
| 9,787,087 B2 | 10/2017 | Petrovic et al. | |
| 9,837,922 B2* | 12/2017 | Lüscher | H02M 7/487 |
| 10,439,431 B2 | 10/2019 | Blair et al. | |
| 2008/0074183 A1* | 3/2008 | Tai | H03F 3/217 |
| | | | 330/10 |
| 2018/0152097 A1 | 5/2018 | Ying et al. | |
| 2018/0241311 A1* | 8/2018 | Schafferer | H02M 3/1584 |

OTHER PUBLICATIONS

European Patent Office, Written Opinion in International Patent Application No. PCT/EP2021/078877, 5 pp. (Nov. 15, 2021).
European Patent Office, Extended European Search Report in European Patent Application No. 20203666.1, 8 pp. (Mar. 31, 2021).
Kolar et al., "The Essence of Three-Phase PFC Rectifier Systems," *2011 IEEE 33rd International Telecommunications Energy Conference* (*INTELEC*), 27 pp. (Oct. 9-13, 2011).
European Patent Office, Office Action in European Patent Application No. 20203666.1, 6 pp. (Aug. 21, 2023).

* cited by examiner

UNINTERRUPTIBLE POWER SUPPLY CONVERTER CIRCUIT

CROSS-REFERENCE TO RELATED APPLICATIONS

This patent application claims priority to International Patent Application No. PCT/EP2021/078877, filed on Oct. 18, 2021, and to European Patent Application No. 20203666.1, filed on Oct. 23, 2020, each of which is incorporated herein in its entirety by reference.

FIELD OF THE DISCLOSURE

The present disclosure generally relates an uninterruptible power supply (UPS) converter circuit, a control circuit in a UPS converter circuit, a usage of a UPS converter circuit, and a usage of an inner switch for an UPS converter circuit.

BACKGROUND OF THE INVENTION

A double-conversion UPS features AC input and output filters, often including filter capacitors, in addition to EMI filter capacitance. Discharge arrangements are provided to bleed the capacitors, in some cases mandated by applicable safety standards to reduce the cap voltage to a safe level within a certain time. Such requirement allows a comparatively large time constant for the capacitor discharge. Hence, the typical solution is passive discharge, i.e., parallel resistor of comparatively large ohmic value to limit losses. Alternative solutions include the disconnection of the discharge element during normal operation to increase efficiency, inserting the discharge element only when needed.

The rectifier AC input filter discharge is more critical. Indeed, the input filter is typically disengaged by means of an input contactor upon a mains outage, and re-engaged when power is restored. In case of micro interruptions, the input contactor may reclose shortly after opening, with relevant residual voltage on the filter capacitors. If the contactor closes at a voltage phase angle which happens to have opposite polarity with respect to the filter capacitor residual voltage, the current inrush is magnified. In this context, full discharge of the AC input cap bank before re-closing the input contactor contains current inrush to a known level.

With the increase in the converter ratings the filter capacitance increases, filter capacitance would scale linearly with the converter power rating. At the same time, parallel discharge resistors are not necessarily scaled accordingly, yielding a larger time constant for the cap discharge.

BRIEF SUMMARY OF THE INVENTION

There may be a desire to improve the reliability of a UPS rating compliance.

The described embodiments similarly pertain to the UPS converter circuit, the control circuit in a UPS converter circuit, the usage of a UPS converter circuit, and the usage of an inner switch for an UPS converter circuit. Synergetic effects may arise from different combinations of the embodiments although they might not be described in detail.

Technical terms are used by their common sense. If a specific meaning is conveyed to certain terms, definitions of terms will be given in the following in the context of which the terms are used.

According to a first aspect, a UPS (Uninterruptible power supply) converter circuit is provided, comprising a controlled switching element, a filter capacitor, and a split DC output capacitor comprising a plus DC capacitor, and a minus DC capacitor split at a DC-link mid-point. The controlled switching element, the filter capacitor, and the plus DC capacitor and a minus capacitor are connected to each other at the DC-link mid-point on a respective first side. A second side of the filter capacitor at an AC point is coupled via an inductor element to a second side of the controlled switching element, the second side of the controlled switching element being coupled to the second side of the plus DC capacitor and the minus capacitor. The controlled switching element is configured to be controlled such that a current from the AC point via the inductor element flows alternatingly to either the plus DC capacitor in case of a positive polarity or the minus DC capacitor in case of a negative polarity, and to the DC-link mid-point, respectively, thereby discharging the filter capacitor.

In a typical converter, the controlled switching element may also be designated as "inner switch". The term "coupling" may not necessarily indicate a direct coupling but, for example coupling via a conducting element such as a diode, wherein the diode is operated as a switch, which is in a conducting state at least in the capacitor discharging phase, which is subject of this disclosure. Further, it is noted that the filter capacitor is coupled via an inductor to the controlled switch.

The converter may be a rectifier or an inverter. The converter may also be a double-conversion UPS comprising a rectifier and an inverter, wherein the design, structures and configurations described herein may be applied to the rectifier and/or the inverter. The converter may comprise a contactor at the input of the rectifier, which opens upon a power outage. The converter may further comprise a contactor at the output of the inverter, which may open, for example, when the load is transferred to the static bypass path. In this context, discharging the inverter filter capacitors yields a known state for the subsequent inverter restart. Moreover, the possibility of quickly discharging the filter facilitates the testing and commissioning in the commissioning phase, saves time and improves the quality of the results by having clear and defined conditions.

The converter may be a three-level single phase or a three-phase converter. A three-phase converter comprises three legs, one for each phase, which are controlled phase shifted during nominal operation. In this disclosure, essentially only one phase, or leg, and only two levels, i.e., the part comprising the plus DC capacitor are described. In some passages of this disclosure, also the mode of operation with respect to the corresponding part comprising the negative DC capacitor is described. The mode of operation for the two parts are essentially the same with different signs of the polarities and opposite directions of the flow of the current as known to a person skilled in the art. The invention relates to both parts, which are engaged depending on the polarity of the voltage at the filter capacitor, at the point of time when an outage occurs or a contactor opens, respectively. The description relating to the part comprising the plus DC capacitor corresponds to a discharge of the filter capacitor during a period of the AC oscillation, where the filter capacitor is charged positively, i.e., the voltage at the AC point is positive with respect to the neutral point. Correspondingly, the part comprising the minus DC capacitor is engaged when the voltage at the AC point is negative with respect to the neutral point. In both cases, the discharge current is conducted via the controlled switch in those switching periods where the switch is closed.

Thus, the circuit may be applied to the further legs, as well as to the part comprising the minus DC capacitor, correspondingly. Having three phases, in the most preferred arrangement, the mid-point of the DC-link is also the mid-point of the three-phase AC filter capacitors. Hence, connecting the AC point to mid-point allows for discharging the AC capacitors.

In case of a rectifier, in nominal operation, the controlled switching element between the mid-point of the DC capacitors and the inductor is used to control the AC input current coming in from the AC point via the inductor. In non-nominal operation, e.g., at an outage of the AC input source, the controlled switching element is used to discharge the filter capacitor, which may be in the rectifier case an input filter capacitor. That is, in order to avoid residual voltage on the input filter capacitor, which may magnify current inrush if the contactor closes at a voltage phase angle having opposite polarity with respect to the filter capacitor residual voltage, the switch is configured such that it discharges the filter capacitor. Closing the inner switch charges the inductor by current, which, once the switch opens, is pushed to the DC capacitor through the diode. In this way, the current from the filter capacitor is alternatingly guided either through the switch to the DC-link mid-point, or to the plus (or minus) DC capacitor. In case the converter is implemented as an inverter, the AC is outgoing, coming from the inductor and flowing to the load. The filter in this case may be an output filter. Besides of the input/output directions of the current, the circuit and the switch work in the same way as in the rectifier implementation to discharge the filter capacitor.

BRIEF DESCRIPTION OF THE SEVERAL VIEWS OF THE DRAWING(S)

DETAILED DESCRIPTION OF THE INVENTION

Figure 1:
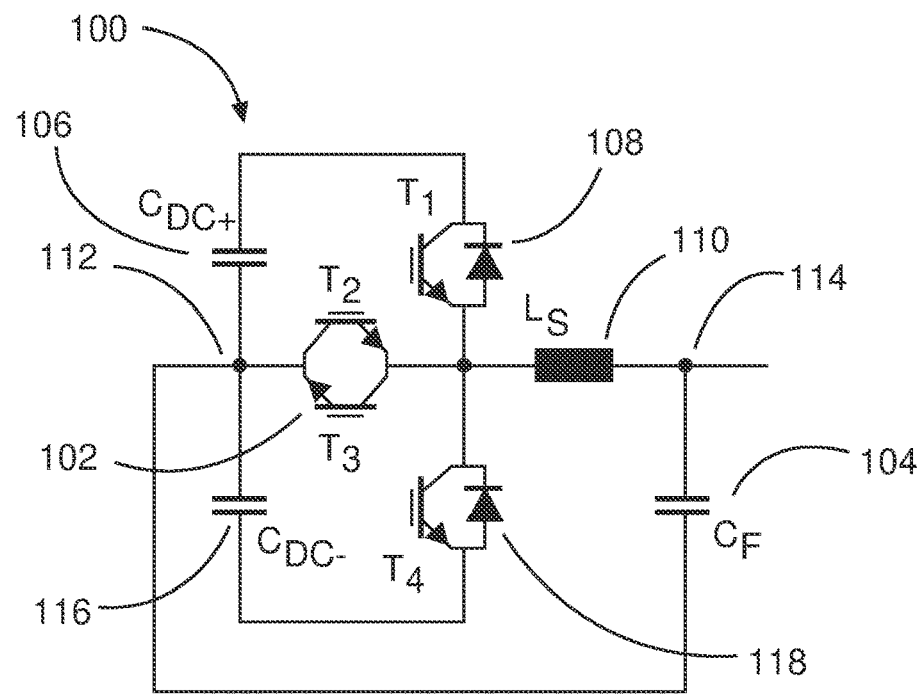
FIG. 1 is a circuit diagram of a TNPC UPS converter according to an embodiment of the present disclosure.

FIG. 1 shows a first circuit diagram of a single-phase leg of a UPS converter 100, in which a switch 102 for discharging a filter capacitor 104 may be applied. The converter 100 in FIG. 1 may be a three level TNPC of which only one phase leg is shown. The filter capacitor 104 is connected to the DC-link mid-point 112 of the plus and minus DC capacitors 106 and 116, respectively. Closing the inner switch 102, which may be a bidirectional switch as shown in FIG. 1, loads the inductor 110 with current, which, once the switch 102 opens, is pushed to the DC conductor through the diode 108 or 118, depending on the polarity.

For example, if the outage occurs at a positive AC cycle, i.e., the filter capacitor is charged with a positive voltage polarity with respect to the Neutral Point (NP), closing the switch 102 (T2/T3) will cause current over inductor 110 to increase, discharging the filter capacitor 104 via the switch 102 to the DC-link mid-point 112 and further via the minus DC capacitor 116 to the negative side of the filter capacitor 104 and back to the inductor 110. Then, upon switch off of switch 102 (T2/T3), the current over the inductor 110 will decrease, flowing through Free-Wheeling Diode 108 of T1 to the positive side of the plus DC capacitor, and flowing further via DC-link mid-point 112 and the negative side of the filter capacitor 104 back to the inductor 110.

As an effect, the input capacitor is discharged so that inrush current containment is obtained. If the capacitor is charged with a polarity opposite to that of the AC voltage being applied when the contactor is closed, the inrush current would be much larger than that in case of a discharged capacitor.

Figure 2:
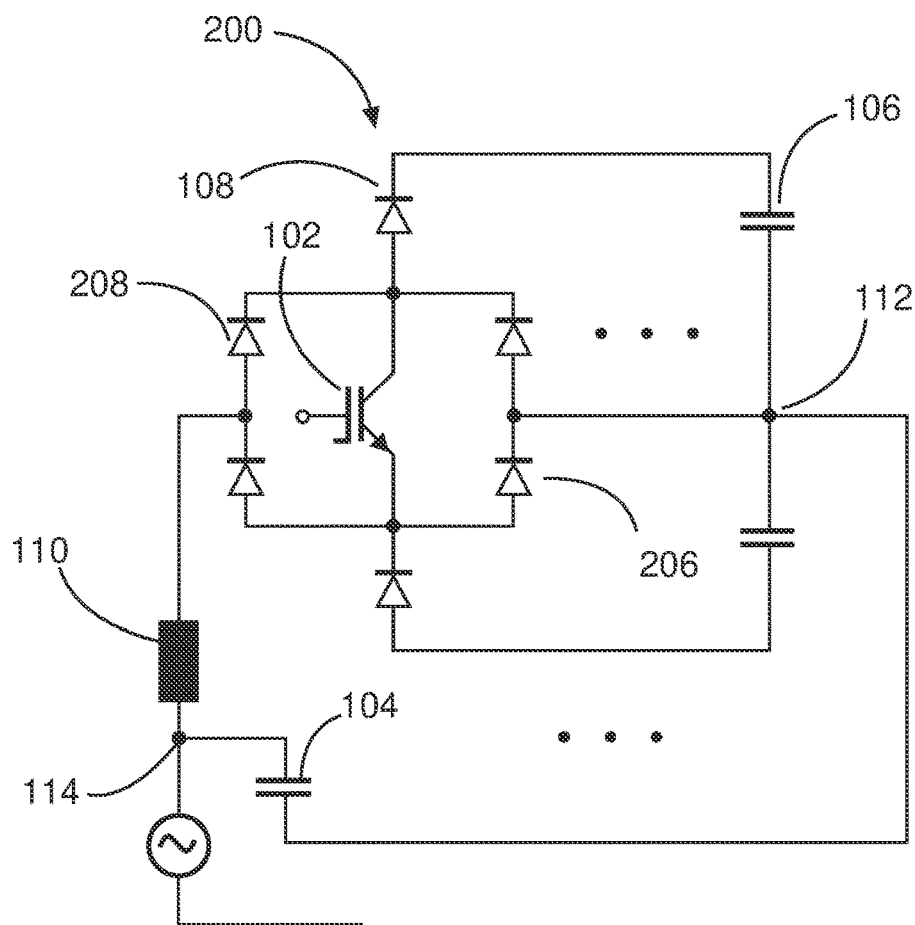
FIG. 2 is a circuit diagram of a UPS Vienna converter according to an embodiment of the present disclosure.

FIG. 2 shows a phase leg of a second converter 200 also known as Vienna converter 200, in which the switch 102 for discharging filter capacitor 104 may be applied. Again, the DC-link mid-point 112 is coupled to the filter capacitor 104. Concerning the discharge of the filter capacitor 104, the operation of the circuit is nearly the same as that of FIG. 1. Diodes 108 and 208 may be regarded as a single diode when switch 102 is open. When switch 102 is closed, the coupling to the DC-link mid-point 112 is provided by diode 206. By the diode arrangement the single switch acts as a bidirectional switch.

Figure 3:
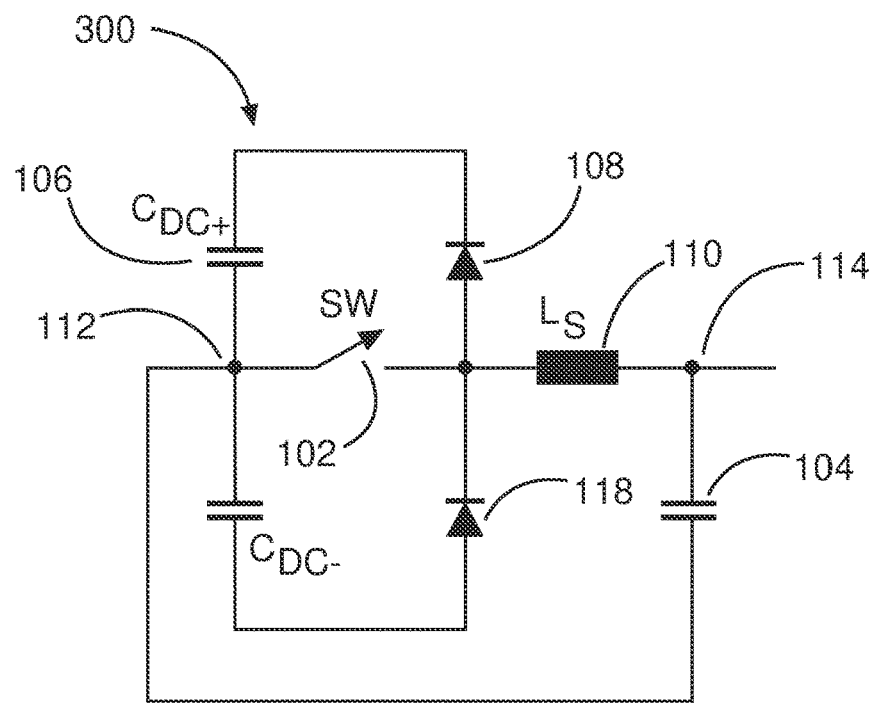
FIG. 3 is a circuit diagram of a basic converter design according to an embodiment of the present disclosure.

Therefore, the converters of FIG. 1 and FIG. 2 may be reduced to a design as shown in FIG. 3, which may also be regarded as Vienna rectifier. That is, the invention can be applied at least to all converters that can be reduced to this design with respect to the discharging of filter capacitor 104 as described herein.

Figure 4:
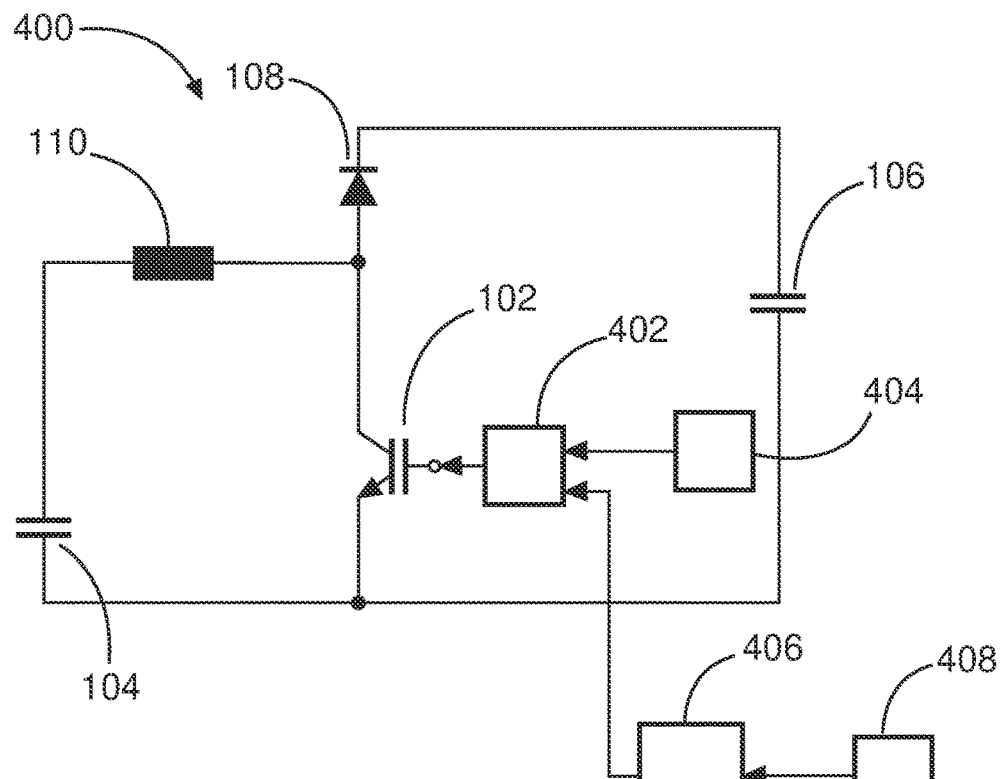
FIG. 4 is a circuit diagram of a simulator of a UPS converter according to an embodiment of the present disclosure.
Figure 5:
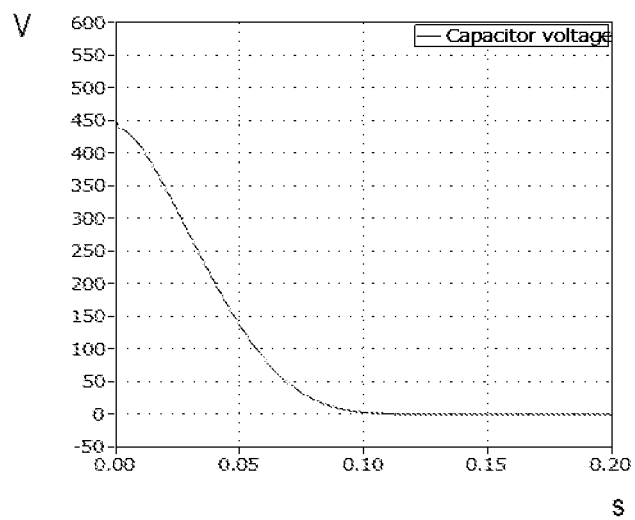
FIG. 5 is a diagram of a capacitor voltage as one result of the simulator of FIG. 4.
Figure 6:
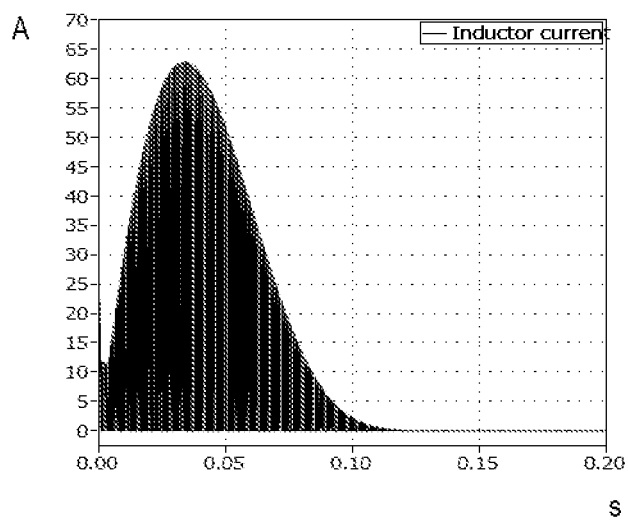
FIG. 6 is a diagram of an inductor voltage as a further result of the simulator of FIG. 4.
Figure 7:
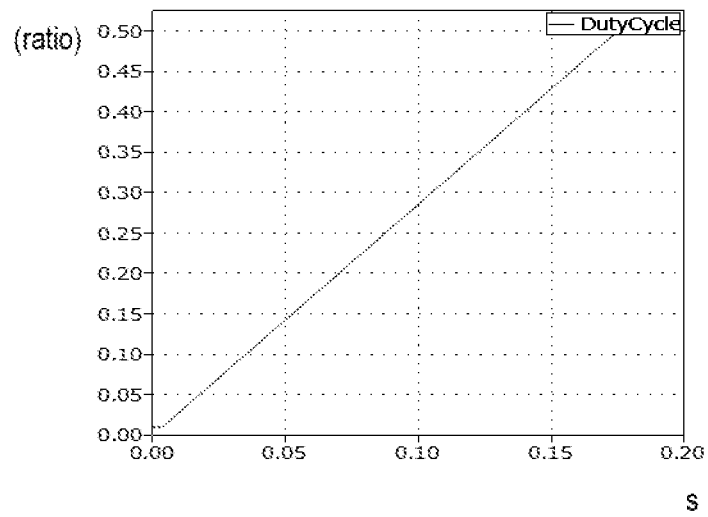
FIG. 7 is a diagram of a simulated duty cycle in accordance with the disclosure.

FIG. 4 depicts a UPS converter simulation design 400 for controlling the controlled switch, with an example of a modulation signal, which may be applied to the controlled switches described herein. The simulation design allows several options of generating a control signal for the switch 102. FIGS. 5 to 7 show the results of the simulation, in which switch 102 was controlled with a sawtooth modulated PWM signal generated based on a signal generated by signal generator 408. The signal may, for example, be a sawtooth signal based on a ramp signal. PWM modulator 406 then generates the rectangular control signal that is input to switch 102. The ramp may be generated, for example, by a waveform generator or by a discrete integrator. Module 402 may be a switch to switch between the PWM modulator and a pulse generated by pulse generator 404. The further elements inductor 110, diode 108, plus DC capacitor 106, and filter capacitor 104 correspond to the ones shown in FIGS. 1 to 3.

Instead of a sawtooth signal, any other shape of modulation signal may be generated. For example, the modulation may be based on a symmetrical PWM using a triangular input signal, a rectangular signal, a curved signal, or a random or pseudo-random signal, for example a white noise signal, or it may be based on hysteretic current control with a variable switching frequency. In the latter cases, the frequency and duty cycle would not be fixed or regular, respectively. A further example of a control signal for switch 102 may be a pulse generated by a pulse generator such as pulse generator 404. The pulses may have a pre-defined but, nevertheless, configurable width, duty-cycle, and frequency. Although the shown circuit is a design of a simulator, the design, the functionalities, and the various signal generation options may be implemented in a product in hardware and/or software and may be embodiments of the described UPS converter. The UPS converter may further be designed such that several control signal options are implemented by hardware and/or software, and one of those control signal options may be selectable. The selection may, for example depend on the application, given requirements, or to provide a possibility for future optimization.

The observed filter capacity voltage and current through the inductor over time observed in the simulation circuit is depicted in FIGS. 5 and 6. FIG. 7 shows the corresponding applied duty cycle over time. The voltage of the filter capacitor 104 drops to zero within about 100 ms, and the inductor current remains below 65 A. In the simulation, the switches are driven in open loop to contain the current peak. This is accomplished by ensuring Discontinuous Conduction Mode (DCM), in which the current is expected to drop back to zero before the next switching cycle, which means that, if the current through the inductor drops to zero before the next turn-on of switch 102 (T2/T3), there will be no current for a portion of the switching cycle. FIG. 7 shows the corresponding duty cycle.

Therefore, a pulsed operation of the inner switches in a three-level converter to discharge the AC filter capacitance while containing the bridge current is provided. The inner switches may be treated as a bidirectional switch driven in open loop, with the duty cycle of the inner switches predetermined according to a known function. The inner switches are selectively driven based on the polarity of the voltage on the AC capacitor. Prompt and full discharge of the AC filter capacitance upon opening of the input contactor is provided, to limit inrush current at a known level at subsequent re-closure.

Other variations to the disclosed embodiments can be understood and effected by those skilled in the art in practicing the claimed invention, from the study of the drawings, the disclosure, and the appended claims. In the claims the word "comprising" does not exclude other elements or steps and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope of the claims.

According to an embodiment, the controlled switching element is configured to be controlled further such that the peak value of the current from the AC point to the DC capacitor, or to the DC-link mid-point, respectively, is below a converter rated current. Preferably, the switching element is controlled such that the current is significantly below the converter rated current.

According to an embodiment, the controlled switching element is configured to receive a PWM-modulated signal to discharge the filter capacitor. Since usually, a pulse width modulation (PWM) circuit is integrated in the UPS circuit for controlling the controlled switching element, this PWM modulation circuit is readily available and can also be used for the present discharging purpose. A PWM circuit may receive an input signal which is turned into a corresponding PWM-modulated signal as output signal, which is provided to the controlled switching element. Therefore, no additional hardware may be necessary to implement this functionality in a converter.

According to an embodiment, the PWM-modulated signal for discharging the filter capacitor is an open loop signal. Therefore, the UPS circuit does not have to be extended by additional sensors, voltage or current measurement circuits, comparers, or any components that would be necessary to implement a closed loop.

According to an embodiment, the PWM-modulated signal is based on a ramp input signal. Particularly, ramping up the duty cycle of the inner switches with a predefined slope is an effective way to ensure a fast discharge with peak current contained to a fraction of the converter rated current. While the preferred embodiment uses a ramp, the pulse width may in further embodiments follow any curve or may even be a fixed, predetermined duty cycle. Other input signals are possible. For example, the reference input may be a pre-defined curve, which based on, for example, a maximum inrush current developing of the circuit.

According to an embodiment the control signal is a pulse. That is, instead of using a pulse width modulated signal, a train of pulses may be used to control the switching of the switching element. The pulses may be generated preferably by the PWM-generator or by a pulse generating circuit with a pre-defined frequency or a pre-defined duty cycle, to which is switched or which is put into this mode in case of a fault or interruption of the mains. The pre-defined frequency and/or the pre-defined duty cycle may follow a pre-defined scheme over time.

Whilst an open loop implementation is a preferred embodiment, the controlled switching element may alternatively be controlled by a PWM-modulated signal that is generated based on a closed loop. Therefore, according to a further embodiment, the PWM-modulated signal may be generated based on a closed loop, wherein the control variable is a specified maximum inrush current of the circuit or a voltage of the plus DC capacitor and/or the minus DC capacitor. Control variables may be the current flowing through the inductor or the voltage of the DC capacitors, or further currents in the circuit. For realizing PWM modulation based on a closed loop, circuits or sensors are necessary to detect the voltage and/or current to be observed.

According to an embodiment, the circuit further comprises a diode, wherein the diode is arranged between the second side of the controlled switching element and the DC capacitor. The diode is an essential element of the UPS converter circuit for guiding, i.e. conducting or blocking currents and is also used at least partly for the discharging process when conducting the discharge current to the plus DC capacitor in case of a positive filter capacity voltage. For a corresponding negative circuit part, a corresponding further diode is implemented for conducting the discharge current to the minus DC capacitor.

According to an embodiment, the circuit further comprises an inductor element. The inductor element is the inductor element between the second side of the filter capacitor and the second side of the controlled switching element. The inductor element receives and stores the charge of the filter capacitor when the controlled switch is closed and provides the stored charge to the DC capacitors when the switch is open or to the DC-link-mid-point when the controlled switch is closed, and also completes the essential design of the UPS converter circuit for working as a converter or inverter with respect of the part of interest of the UPS converter. Thus, the inductor element is in particular responsible for driving the discharge current via the above-mentioned diode to the plus DC capacitor, or the minus DC capacitor, respectively.

The converter type may be, according to a further embodiment, a three phase, three level NPC (Neutral Point Converter), a three phase, three level TNPC (Neutral Point Converter in T-form) or a Vienna converter. The various types may differ in additional diodes and switches, or in different designs. However, for example regarding a conducting diode or a closed switch as a conductor and disregarding a blocking diode or an open switch for the filter capacitor discharging process, the designs may be reduced to the basic components described herein.

According to an embodiment, the controlled switching element is a transistor of one of the following types: IGBT, thyristor, MOSFET or any other type of switchable semiconductor or conductor that is capable of handling the voltages, currents and switching frequency according to the requirements of the application, taking also into account security and compliance with regulation.

According to an embodiment, the switch is a bidirectional switch. That is, in a preferred embodiment, the configuration may include an anti-parallel connection of, for example, reverse-blocking IGBTs. The inner switch may therefore be considered as a single bi-directional switch realized with, for example two IGBTs. Consequently, the discharging of the filter capacitor works irrespective of voltage polarity on the capacitor.

According to an embodiment, the UPS converter circuit further comprises a control circuit configured to control the controlled switching element. The control circuit may comprise a PWM-modulator employing a dedicated modulation scheme based on, for example, a ramp, a curve, or a static signal as input. The control circuit may further comprise a switch for switching from a nominal converter mode to an outage mode, wherein the outage mode is the mode described in this disclosure. The control circuit may further comprise a memory for storing values of a pre-defined curve or parameters for defining a curve according to which the PWM signal is generated, and which is used for discharging the filter capacitor. The control circuit may be a digital, an analogue or a mixed circuit, and may comprise logic and storage modules. The logic may be hardwired and/or programmable. Therefore, the control circuit may comprise elements like a micro controller, a field programmable gate array (FPGA), an ASIC, a Complex Programmable Logic Devices (CPLD), or any other programmable logic devices known to person skilled in the art as well as memory for storing instructions or a program element, which when being executed by the programmable logic device, instructs the controller to perform the switching of the controlled switch in the way described in this disclosure.

Therefore, according to an aspect, a control circuit in a UPS converter circuit is provided, wherein the control circuit is configured to control the controlled switching element.

According to a further aspect, the usage of a UPS converter circuit as described in this disclosure in a high-density computing environment, colocation, process automation, hosting cloud or telecommunications data center is provided. That is, the UPS converter may be used in any IT environment, especially in an IT environment that comprises a plurality of devices, and which relies on a continued operation, also in case of outages, especially of short outages where the filter capacitor would still be charged when the contactor is re-closed.

According to a further aspect, the usage of an inner switch, such as the described switching element, for such a UPS converter circuit for discharging a capacitor is provided. As described above, the inner switch connects the mid-point of the DC-link capacitors with a first side of an inductor, wherein the second side of the inductor is coupled to the filter capacity to be discharged.

The disclosed invention allows efficient discharge of AC filter capacitors. The power converters are used to that end, employing a dedicated modulation scheme. This ensures a fast discharge of the capacitors with minimal stress on the converters. Thus, the invention provides a UPS converter circuit which allows to discharge a filter capacitor with a minimum effort. In some embodiments, the circuit design in some cases may not need to be modified, or the number of components may be even reduced. For example, passive discharge resistors could potentially be omitted or limited to the bare minimum required by the safety standard, with benefits in terms of cost, footprint and efficiency.

The features described above and other features, aspects and advantages of the present invention will become better understood with reference to the accompanying figures and the following description.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. An uninterruptible power supply (UPS) converter circuit, comprising:
   a controlled switching element;
   a filter capacitor;
   a diode; and a split DC capacitor comprising a plus DC capacitor and a minus DC capacitor split at a DC-link mid-point;

wherein the controlled switching element, the filter capacitor, the plus DC capacitor and the minus DC capacitor are connected to each other at the DC-link mid-point on a respective first side;

wherein a second side of the filter capacitor at an AC point is coupled via an inductor element to a second side of the controlled switching element, the second side of the controlled switching element being coupled to the second side of the plus DC capacitor and the minus DC capacitor;

the diode connecting the first side of the inductor element at the DC-link mid-point with the second side of the plus DC capacitor; and wherein the controlled switching element is configured to be controlled in non-nominal operation to discharge the filter capacitor such that a current from the AC point via the inductor element flows alternatingly through the diode to the second side of the plus DC capacitor and to the DC-link mid-point, respectively, thereby discharging the filter capacitor.

2. The uninterruptible power supply converter circuit according to claim 1, wherein the controlled switching element is configured to be controlled further such that a peak value of the current from the AC point to the DC capacitor or to the DC-link mid-point, respectively, is below a converter rated current.

3. The uninterruptible power supply converter circuit according to claim 1, wherein the controlled switching element is configured to receive a pulse width modulated (PWM) signal to discharge the filter capacitor.

4. The uninterruptible power supply converter circuit according to claim 3, wherein the PWM signal for discharging the filter capacitor is an open loop signal.

5. The uninterruptible power supply converter circuit according to claim 3, wherein the PWM signal is based on a ramp input signal.

6. The uninterruptible power supply converter circuit according to claim 3, wherein the PWM signal is a pulse.

7. The uninterruptible power supply converter circuit according to claim 3, wherein the PWM signal is generated on a closed loop, and wherein the control variable is a maximum inrush current of the circuit or a voltage of the plus DC capacitor and/or the minus DC capacitor.

8. The uninterruptible power supply converter circuit according to claim 1, wherein the diode is arranged between the second side of the controlled switching element and the plus DC capacitor.

9. The uninterruptible power supply converter circuit according to claim 1, further comprising an inductor element disposed in circuit connection between the filter capacitor second side and the controlled switching element second side.

10. The uninterruptible power supply converter circuit according to claim 1, wherein the UPS converter circuit is a three phase, three level Neutral Point Converter (NPC), a three phase, three level Neutral Point Converter in T-form (TNPC) or a Vienna-type converter.

11. The uninterruptible power supply converter circuit according to claim 1, wherein the controlled switching element is a transistor of one of the types IGBT, thyristor, MOSFET.

12. The uninterruptible power supply converter circuit according to claim 1, further comprising a control circuit configured to control the controlled switching element.

* * * * *